United States Patent
Rao et al.

(10) Patent No.: US 7,640,329 B2
(45) Date of Patent: *Dec. 29, 2009

(54) SCALING AND EXTENDING UPNP V1.0 DEVICE DISCOVERY USING PEER GROUPS

(75) Inventors: Ravi T. Rao, Redmond, WA (US); Gurunathan Kumaraguru, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

This patent is subject to a terminal disclaimer.

(21) Appl. No.: 11/059,589

(22) Filed: Feb. 15, 2005

(65) Prior Publication Data

US 2006/0184693 A1 Aug. 17, 2006

(51) Int. Cl.
*G06F 15/173* (2006.01)
(52) U.S. Cl. .................................. 709/223; 709/238
(58) Field of Classification Search ................ 709/223, 709/224, 238
See application file for complete search history.

(56) References Cited

U.S. PATENT DOCUMENTS

| | | | |
|---|---|---|---|
| 4,874,963 A | 10/1989 | Alspector | |
| 5,293,457 A | 3/1994 | Arima et al. | |
| 6,725,281 B1 | 4/2004 | Zintel et al. | |
| 6,779,004 B1 | 8/2004 | Zintel | |
| 6,892,230 B1 | 5/2005 | Gu et al. | |
| 7,139,838 B1 * | 11/2006 | Squire et al. ............... | 709/242 |
| 2002/0027569 A1 | 3/2002 | Manni et al. | |
| 2002/0078161 A1 * | 6/2002 | Cheng ....................... | 709/208 |
| 2002/0083143 A1 * | 6/2002 | Cheng ....................... | 709/208 |
| 2002/0112058 A1 | 8/2002 | Weisman et al. | |
| 2002/0143989 A1 | 10/2002 | Huitema et al. | |
| 2002/0165948 A1 * | 11/2002 | Vincent ....................... | 709/223 |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0097425 A1 | 5/2003 | Chen | |
| 2003/0117433 A1 | 6/2003 | Milton et al. | |
| 2003/0204742 A1 | 10/2003 | Gupta et al. | |

(Continued)

OTHER PUBLICATIONS

Todd Manion et al., "Introduction to Windows Peer-to-Peer Networking", Jan. 2003.*

(Continued)

*Primary Examiner*—Aaron Strange
(74) *Attorney, Agent, or Firm*—Marshall, Gerstein & Borun LLP

(57) ABSTRACT

Disclosed is a method for scaling and extending the reach of UPnP device discovery and eventing by leveraging the use of a peer-to-peer network infrastructure. Peer-to-peer networking allows for the organization of a set of nodes into a group for efficient exchange of information and the group has an efficient and scalable mechanism for flooding data to all members in it. In one embodiment one PC in a peer group can receive device discovery announcements and subscribe for device event notifications. A discovery proxy and an eventing proxy running on the PC package the announcement and/or notification in a record and proceed to flood it to the group. The group flooding semantics route the notification to the subscribed controllers, which can subsequently take suitable action. Ultimately, this method produces a result whereby device discovery and eventing tasks can be fulfilled by locating the closest peer and obtaining the device announcements and notifications from that peer.

20 Claims, 9 Drawing Sheets

U.S. PATENT DOCUMENTS

| | | | |
|---|---|---|---|
| 2003/0208563 A1* | 11/2003 | Acree et al. ................. | 709/219 |
| 2004/0111469 A1 | 6/2004 | Manion et al. | |
| 2004/0111515 A1 | 6/2004 | Manion et al. | |
| 2004/0148333 A1 | 7/2004 | Manion et al. | |
| 2004/0190549 A1 | 9/2004 | Huitema | |
| 2004/0207866 A1* | 10/2004 | Heiney et al. .............. | 358/1.15 |
| 2004/0233904 A1* | 11/2004 | Saint-Hilaire et al. ....... | 370/389 |
| 2004/0249907 A1 | 12/2004 | Brubacher et al. | |
| 2004/0255029 A1 | 12/2004 | Manion et al. | |
| 2004/0260800 A1 | 12/2004 | Gu et al. | |
| 2005/0004916 A1 | 1/2005 | Miller et al. | |
| 2005/0022210 A1 | 1/2005 | Zintel et al. | |
| 2005/0074018 A1 | 4/2005 | Zintel et al. | |
| 2005/0091529 A1 | 4/2005 | Manion et al. | |
| 2005/0097503 A1 | 5/2005 | Zintel et al. | |
| 2005/0108371 A1 | 5/2005 | Manion et al. | |
| 2005/0157659 A1 | 7/2005 | Huitema et al. | |
| 2005/0177715 A1 | 8/2005 | Somin et al. | |
| 2005/0210155 A1* | 9/2005 | Oeda et al. .................. | 709/249 |
| 2005/0267935 A1* | 12/2005 | Gandhi et al. ............... | 709/203 |
| 2006/0153072 A1* | 7/2006 | Bushmitch et al. .......... | 370/230 |
| 2006/0155980 A1* | 7/2006 | Bodlaender ................. | 713/100 |

OTHER PUBLICATIONS

"Teredo Overview," Microsoft Corporation, website, 30 pages available at http://www.microsoft.com/technet/prodtechnol/winxppro/maintain/teredo.mspx, © 2003 Microsoft Corporation.

Box, "Code Name Indigo: A Guide To Developing And Running Connected Systems With Indigo," dated Jan. 2004, MSDN Magazine, 11 pages.

Chappell, *Introducing Indigo: An Early Look*," (Longhorn Technical Articles) dated Feb. 2005, Microsoft.com Library, 18 pages.

Ng, T.S., et al., "Towards Global Network Positioning," Extended Abstract, ACM SIGCOMM Internet Measurement Workshop 2001, San Francisco, CA, Nov. 2001.

Ng, T.S., et al., "Predicting Internet Network Distance with Coordinates-Based Approaches," INFOCOM'02, New York, NY, Jun. 2002.

Cox, R., et al., "Practical, Distributed Network Coordinates," HotNets Workshop, 2003.

Ng, T.S., et al., "A Network Positioning System for the Internet," USENIX Annual Technical Conference 2004, Boston, MA, Jun. 2004.

Ng, T.S., et al., "Global Network Positioning: A New Approach to Network Distance Prediction," Student Poster, SIGCOMM'01, San Diego, CA Aug. 2001.

Dabek, F., et al., "Vivaldi: A Decentralized Network Coordinate System," SIGCOMM 2004, Aug. 2004.

Costa et al. "PIC: Practical Internet Coordinates for Distance Estimation," ICDCS 2004 (Mar. 2004).

"Neural Network," Wikipedia Encyclopedia, http://en.wikipedia.org/wiki/Neural_network (Mar. 16, 2006).

"Explorations in Parallel Distributed Processing," McClelland et al., The Massachusetts Institute of Technology, 1988.

"Genetic algorihm," http://www.google.com/search?sourceid-navclient&ie-UTF-8&rls-GGLG,GGLG:2005-3 (Mar. 2006).

Zhang et al. "Brushwood: Distributed Trees in Peer-to-Peer Systems" (Mar. 2006).

"Latency," http://whatis.techtarget.com/definition/0,,sid9_gci212456,00.html (Mar. 2006).

"Distributed hash table," http://en.wikipedia.org/wiki/Distributed_hash_table (Mar. 2006).

"Genetic algorithm," http://en.wikipedia.org/wiki/Genetic_algorithm (Mar. 2006).

"Artificial Neural Network," Wikipedia Encyclopedia, http://en.wikipedia.org/wiki/Artificial_neural_network (Mar. 14, 2006).

"Peer-to-Peer Infrastructure: PeerGroupEnumMembers," Microsoft, http://msdn.microsoft.com/library/en-us/p2psdk/p2p/peergroupenummembers.asp?frame=true.

"Peer-to-Peer Infrastructure: Grouping API Functions," Microsoft, http://msdn.microsoft.com/library/en-us/p2psdk/p2p/grouping_api_functions.asp?frame=true.

"Peer-to-Peer Infrastructure: Creating a Group Chat Application," Microsoft, http://msdn.microsoft.com/library/en-us/p2psdk/p2p/creating_a_group_chat_application.asp....

"Peer-to-Peer Infrastructure: Identity Manager Functions," Microsoft, http://msdn.microsoft.com/library/en-us/p2psdk/p2p/identity_manager_functions.asp?frame.

"The Cable Guy— Nov. 2003: Windows Peer-to-Peer Networking," Microsoft Technet, http://www.microsoft.com/technet/community/columns/cableguy/cg1103.mspx.

* cited by examiner

SCALING AND EXTENDING UPNP V1.0 DEVICE DISCOVERY USING PEER GROUPS

TECHNICAL FIELD

The present invention relates generally to the discovery and control of networked devices and services and, more particularly, to methods for scaling device discovery and eventing using a peer-to-peer networking infrastructure.

BACKGROUND OF THE INVENTION

Device Plug and Play (PnP) capabilities available in today's operating systems evolved out of a need for easier setup, configuration, and addition of peripherals to a PC. Universal Plug and Play (UPnP) extends this simplicity to include the entire network, enabling discovery and control of networked devices and services, such as network-attached printers, Internet gateways, and consumer electronics equipment. UPnP, however, is more than just a simple extension of the Plug and Play peripheral model. It is designed to support zero-configuration, "invisible" networking, and automatic discovery for a breadth of device categories from a wide range of vendors.

With UPnP, a device can dynamically join a network, obtain an IP address, convey its capabilities, and learn about the presence and capabilities of other devices—all automatically; truly enabling zero configuration networks. Devices can subsequently communicate with each other directly; thereby further enabling peer to peer networking. The varieties of device types that can benefit from a UPnP enabled network are large and include intelligent appliances, wireless devices, and PCs of all form factors. The scope of UPnP is large enough to encompass many existing, as well as new and exciting scenarios including home automation, printing and imaging, audio/video entertainment, kitchen appliances, automobile networks, and proximity networks in public venues.

There are many ways automatic discovery and control of devices can make life easier and better and the advent of UPnP is opening up new possibilities and uses every day. For example, if an individual were to come home today with a new printer to use on his existing home network, he would have to take several steps to make sure that the printer could be used by all of the PCs on the network, let alone available to any other device that may have a need to print. Specifically, he would need to connect the printer to an existing PC, load the device driver, share the printer on the network, then go to each of the other PCs on the network and connect to that shared printer. With UPnP, he can instead simply plug the printer into any available network port, be it phone line, power line, or Ethernet, and have the printer immediately available to all devices and users of the network.

In addition to device discovery, UPnP also provides an infrastructure for device eventing as well. UPnP devices may contain one or more services which expose actions that model the various services' states using state variables. For instance, a clock service could be modeled as having a state variable, current_time, which defines the state of the clock, and two actions, set_time and get_time, which allows for control of the service. A service in a UPnP device consists of a state table, a control server, and an event server. The state table models the state of the service through state variables and updates them when the state changes. The control server receives action requests (such as set_time), executes them, updates the state table and returns responses. The event server publishes events to interested subscribers anytime the state of the service changes. For instance, the clock service could send an event to interested subscribers when its state changes to "alarm ringing."

Automatic discovery and control of networked devices in UPnP is achieved in large part through the use of control points. A control point in a UPnP network is a controller capable of discovering and controlling other devices. Once devices are attached to the network and addressed appropriately, discovery can take place. Discovery is handled by the Simple Service Discovery Protocol (SSDP). When a device is added to the network, SSDP allows that device to advertise its services to control points on the network. When a control point is added to the network, SSDP allows that control point to search for devices of interest on the network. The fundamental exchange in both cases is a discovery message containing a few, essential specifics about the device or one of its services, for example its type, identifier, and a pointer to its XML (Extensible Markup Language) device description document. After discovery, a control point could: retrieve the device description and get a list of associated services; retrieve service descriptions for interesting services; invoke actions to control the service; and subscribe to the service's event source.

UPnP v1.0 device discovery and eventing is currently quite inefficient when a large number of control points exist. With respect to device discovery, it is highly desirable that devices are able to be discovered in a rapid fashion. Specifically, the goal with discovery is to ensure that all control points receive the announcement that a device has joined the network. The goal with eventing is to ensure that all control points get the notification of an update on the device. For instance, if the various control points are displaying a user interface showing the current picture on a picture frame, then if one of the control points shifts to the next picture, then the rest of the control points are sent a notification by the device about the change in its status.

As it stands now, the above processes are extremely inefficient. In each case the device sequentially establishes a connection with each control point and sends it an announcement or notification. In the presence of a large number of control points, this mechanism does not scale efficiently, and many control points end up getting announcements and notifications much later than the initial ones.

In addition, discovery of devices does not extend beyond the subnet. Scenarios exist where there is a need to discover devices beyond just the subnet. For instance, an extended family that is geographically distributed may be interested in discovering a printer in one of the users' home and being able to print to it.

Accordingly, a need exists for a method that is able to effectively scale UPnP device discovery and eventing in the presence of a large number of control points, and to extend the scope of discovery beyond the local subnet. The invention provides such a method. These and other advantages of the invention, as well as additional inventive features, will be apparent from the description of the invention provided herein.

SUMMARY OF THE INVENTION

In view of the foregoing, the present invention provides a method for effectively scaling UPnP device discovery and eventing by leveraging the use of a peer-to-peer network infrastructure. Peer-to-peer networking provides an infrastructure that enables computing devices to communicate and share information securely with one another without the need of a server or other third party to facilitate the communication.

Peer-to-peer networking allows for organization of a set of nodes for efficient exchange of information. Such an organization is called a group; groups are secure. In the context of a group, members can share data with each other. For instance, members can share pictures of their vacations with each other. The members can be anywhere over the Internet. The mechanism of sharing data involves sending it to the group. The group has an efficient mechanism for flooding data to all members in it, and this mechanism is scalable as well.

In the peer-to-peer infrastructure, peer groups can also facilitate the efficient distribution of metadata over networks. In the case of the present invention, the group would be comprised of all the control points that are interested in receiving device event notifications. The metadata could be UPnP announcement and notification data. Thus, a peer-to-peer networking infrastructure can be effectively employed to improve the efficiency, scale, and reach of device announcement and notification distribution. In a network of peers, a handful of the peers can receive device announcements and notifications from the UPnP device. These peers can then flood this content out to a few more peers who in turn can send the device announcements and notifications along to others. Ultimately, this method produces a result whereby device discovery and eventing tasks can be fulfilled by locating the closest peer and obtaining the device announcements and notifications from that peer.

In one embodiment one PC in a peer group can receive device discovery announcements and subscribe for device event notifications. A discovery proxy and an eventing proxy running on the PC could package the announcement and/or notification in a record and proceed to flood it to the group. The group flooding semantics would now efficiently and reliably route the notification to the various subscribed controllers, which can subsequently take suitable action.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
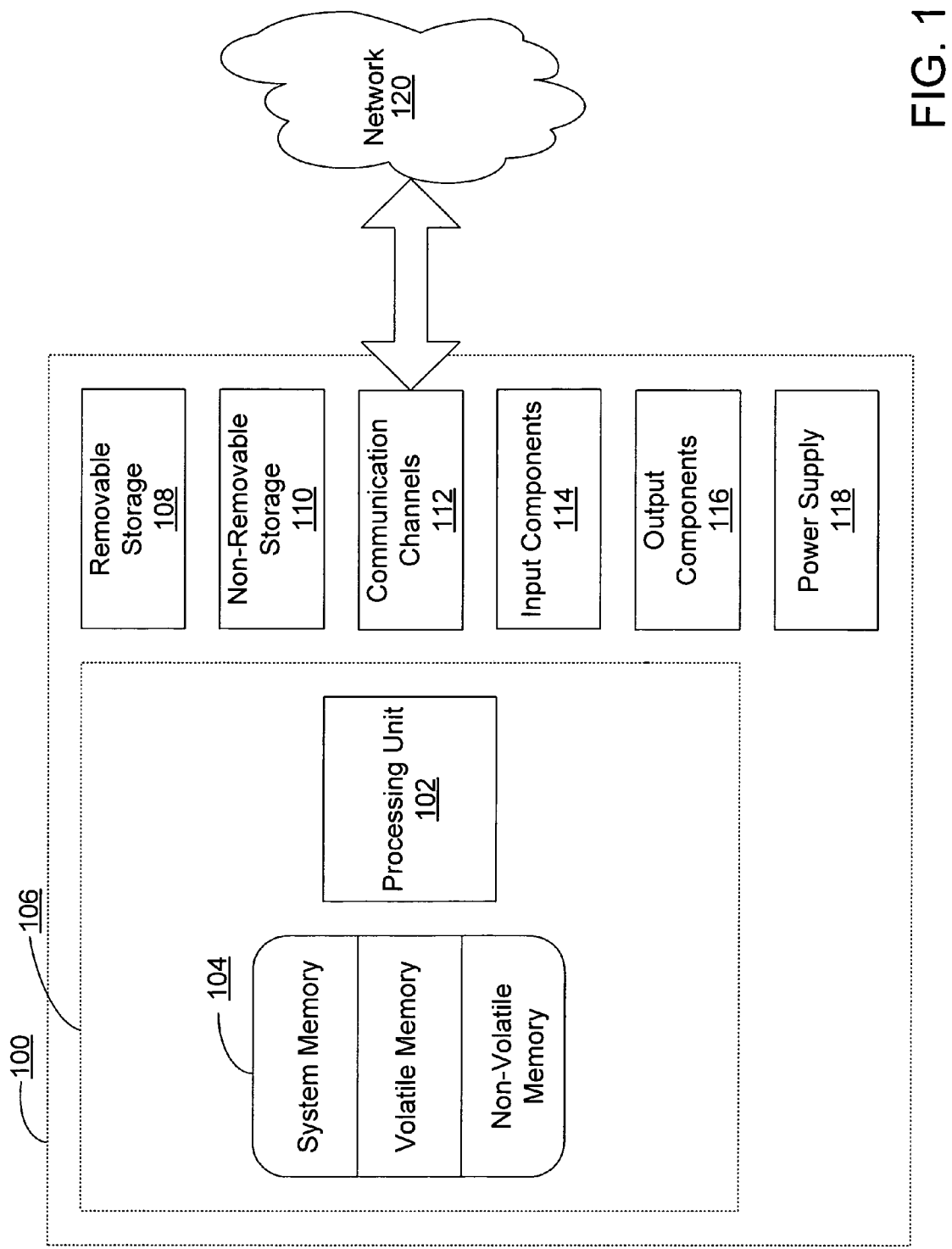
FIG. 1 is a schematic diagram of an exemplary computer architecture on which the method of the present invention can be implemented.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Referring to FIG. 1, in one embodiment the present invention relates to a method for effectively scaling UPnP device discovery and eventing by leveraging the use of a peer-to-peer network infrastructure residing on a computing device. The computing device can be a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices, such as communicating with other devices over a network 120. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Universal Plug and Play

The present invention is directed to a method for effectively scaling UPnP device discovery and eventing by leveraging the use of a peer-to-peer network infrastructure. UPnP extends the concepts of Plug and Play to include the entire network, enabling discovery and control of networked devices and services, such as network-attached printers, Internet gateways, and consumer electronics equipment. With UPnP, a device can dynamically join a network, obtain an IP (Internet Protocol) address, convey its capabilities, and learn about the presence and capabilities of other devices—all automatically; truly enabling zero configuration networks. Devices can subsequently communicate with each other directly; thereby further enabling peer to peer networking. The varieties of device types that can benefit from a UPnP enabled network are large and include intelligent appliances, wireless devices, and PCs of all form factors.

Figure 2:
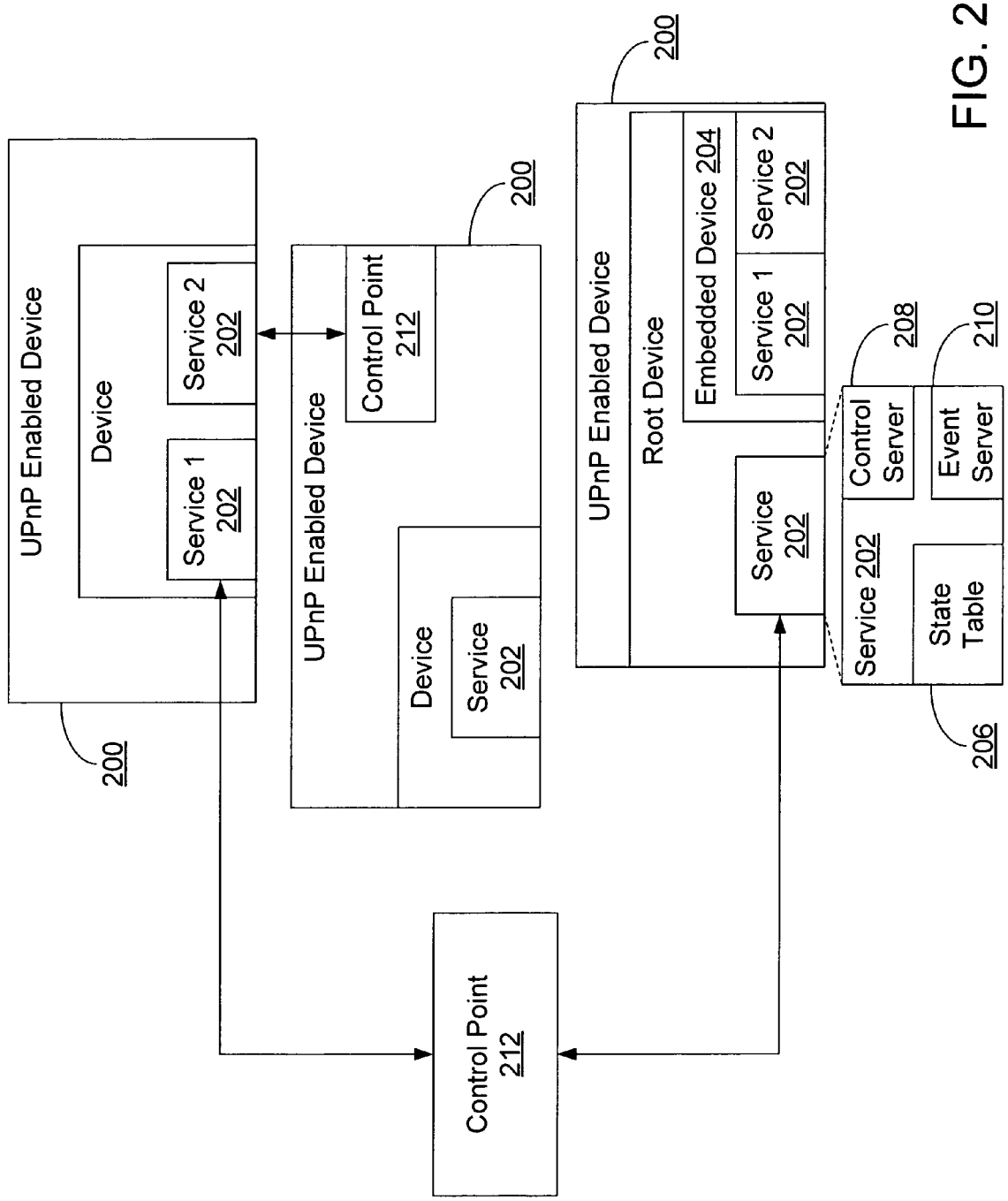
FIG. 2 is a schematic diagram showing the components of an exemplary UPnP network.

Turning to FIG. 2, the basic building blocks of a UPnP network—devices 200, services 202 and control points—are illustrated. A UPnP device 200 is a container of services 202 and nested devices 204. For instance, a VCR device may consist of a tape transport service, a tuner service, and a clock service. A TV/VCR combo device would consist not just of services, but a nested device as well. Different categories of UPnP devices 200 will be associated with different sets of services 202 and embedded devices 204. For instance, services within a VCR will be different than those within a printer. Consequently, different working groups will standardize on the set of services 202 that a particular device 200 type will provide. All of this information is captured in an XML (Extensible Markup Language) device description document that the device 200 must host. In addition to the set of services 202, the device description also lists the properties (such as device name and icons) associated with the device 200.

The smallest unit of control in a UPnP network is a service 202. A service 202 exposes actions and models its state with state variables. For instance, a clock service could be modeled as having a state variable, current_time, which defines the state of the clock, and two actions, set_time and get_time, which allow you to control the service. Similar to the device description, this information is part of an XML service description standardized by the UPnP forum. A pointer (URL) to these service descriptions is contained within the device description document. Devices 200 may contain multiple services 202.

A service 202 in a UPnP device consists of a state table 206, a control server 208, and an event server 210. The state table 206 models the state of the service 202 through state variables and updates them when the state changes. The control server 206 receives action requests (such as set_time), executes them, updates the state table 206, and returns responses. The event server 210 publishes events to interested subscribers anytime the state of the service 202 changes. For instance, the clock service would send an event to interested subscribers when its state changes to "alarm ringing."

A control point 212 in a UPnP network is a controller capable of discovering and controlling other devices 200. After discovery, a control point 212 could: retrieve the device description and get a list of associated services 202; retrieve service descriptions for interesting services 202; invoke actions to control the service 202; and subscribe to the service's event source. Anytime the state of the service changes, the event server 210 will send an event to the control point 212. It is expected that devices 200 will incorporate control point 212 functionality (and vice-versa) to enable true peer-to-peer networking.

UPnP leverages the standard IP protocol suite to remain network media agnostic. Devices on a UPnP network can be connected using any communications media including Radio Frequency (RF, wireless), phone line, power line, IrDA, Ethernet, and IEEE 1394. In other words, any medium that can be used to network devices together can enable UPnP. The only concern might be that the media being used supports the bandwidth required for the intended use. UPnP uses open, standard protocols such as TCP/IP (Transmission Control Protocol/Internet Protocol), HTTP (Hypertext Transfer Protocol), and XML.

UPnP leverages many existing standard protocols. Using these standardized protocols aids in ensuring interoperability between vendor implementations. The protocols used to implement UPnP are found in use on the Internet and on local area networks everywhere. This prevalence ensures that there is a large pool of people knowledgeable in implementing and deploying solutions based on these protocols. Since the same protocols are already in use, little needs to be done to make UPnP devices work in an existing networked environment.

Figure 3:
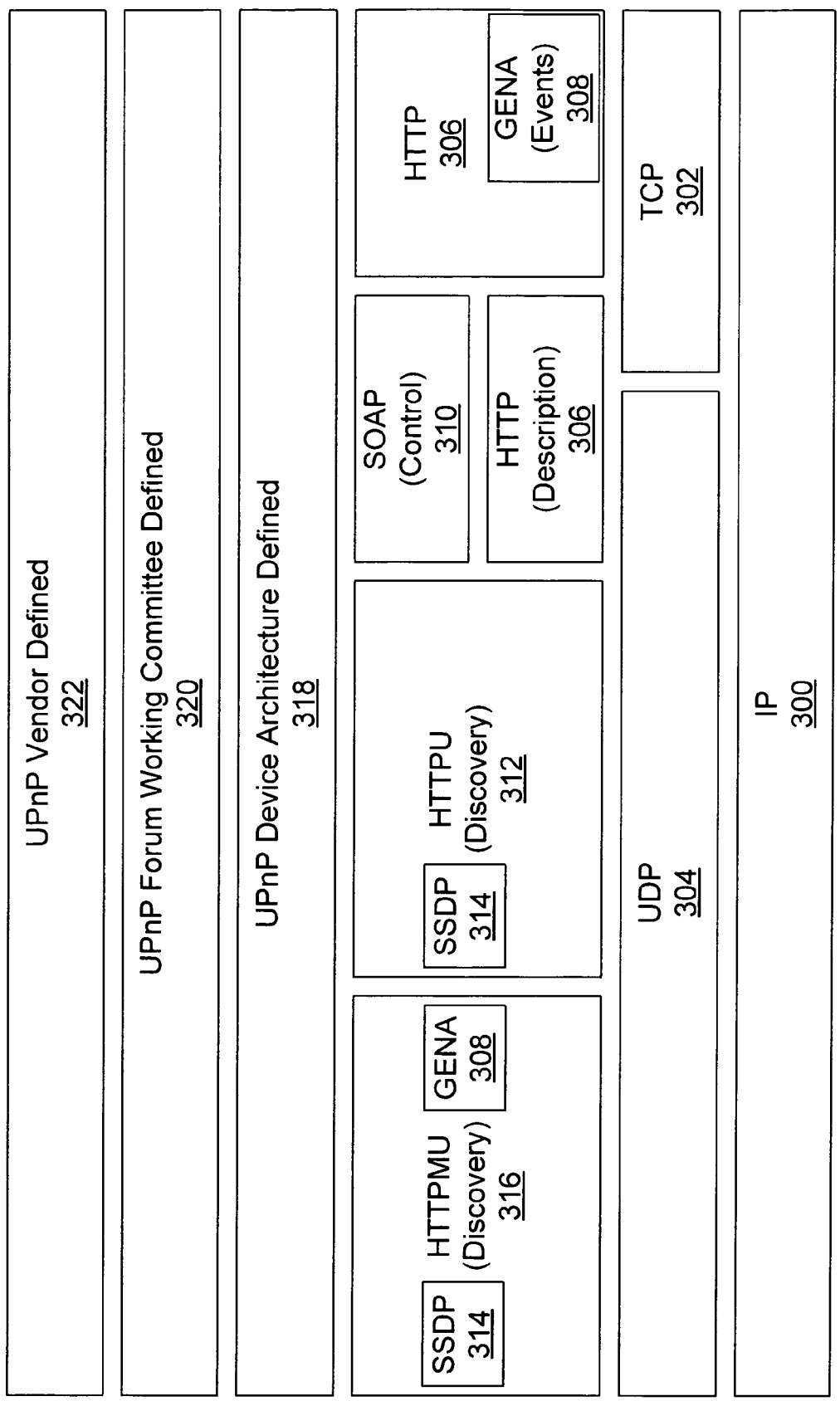
FIG. 3 is a schematic diagram showing an exemplary UPnP networking infrastructure architecture.

With reference to FIG. 3, the UPnP protocol stack is illustrated. UPnP vendors, UPnP Forum Working Committees, and the UPnP Device Architecture document define the highest layer protocols 322, 320, 318 used to implement UPnP. Based on the device architecture, the working committees define specifications specific to device types such as VCRs, HVAC systems, dishwashers, and other appliances. Subsequently, UPnP Device Vendors add the data specific to their devices such as the model name, URL, etc.

The TCP/IP 302, 300 networking protocol stack serves as the base on which the rest of the UPnP protocols are built. By using the standard, prevalent TCP/IP protocol suite, UPnP leverages the protocol's ability to span different physical media and ensures multiple vendor interoperability. UPnP devices can use many of the protocols in the TCP/IP stack including TCP, UDP (User Datagram Protocol) 304, IGMP (Internet Group Management Protocol), ARP (Address Resolution Protocol), and IP 300 as well as TCP/IP services such as DHCP (Dynamic Host Configuration Protocol) and DNS (Domain Name Services).

TCP/IP 302, 300 provides the base protocol stack to provide network connectivity between UPnP devices. HTTP 306 which is hugely responsible for the success of the Internet is also a core part of UPnP. Most aspects of UPnP build on top of HTTP 306 or its variants. HTTPU (HTTP Unicast over UDP) 312 and HTTPMU (HTTP Multicast over UDP) 316 are variants of HTTP 306 defined to deliver messages on top of UDP/IP 304, 300 instead of TCP/IP 302, 300. These protocols are used by SSDP 314, described below. The basic message formats used by these protocols adheres with that of HTTP 306 and is required both for multicast communication and when message delivery does not require the overhead associated with reliability.

Simple Service Discovery Protocol (SSDP) 314, as the name implies, defines how network services can be discovered on the network. SSDP 314 is built on HTTPU 312 and HTTPMU 316 and defines methods both for a control point to locate resources of interest on the network, and for devices to announce their availability on the network. By defining the use of both search requests and presence announcements, SSDP 314 eliminates the overhead that would be necessary if only one of these mechanisms is used. As a result, every control point on the network has complete information on network state while keeping network traffic low. Both control points and devices use SSDP 314. A UPnP control point, upon booting up, can send an SSDP 314 search request (over HTTPMU 312), to discover devices and services that are available on the network. The control point can refine the search to find only devices of a particular type (such as a VCR), particular services (such as devices with clock services) or even a particular device.

UPnP devices listen to the multicast port. Upon receiving a search request, the device examines the search criteria to determine if they match. If a match is found, a unicast SSDP 314 (over HTTPU 312) response is sent to the control point. Similarly, a device, upon being plugged into the network, will send out multiple SSDP 314 presence announcements advertising the services it supports. Both presence announcements and unicast device response messages contain a pointer to the location of the device description document, which has information on the set of properties and services supported by the device. In addition to the discovery capabilities provided, SSDP 314 also provides a way for a device and associated service(s) to gracefully leave the network (i.e., bye-bye notification) and includes cache timeouts to purge stale information for self healing.

Generic Event Notification Architecture (GENA) 308 was defined to provide the ability to send and receive notifications using HTTP 306 over TCP/IP 302, 300 and multicast UDP 304. GENA 308 also defines the concepts of subscribers and publishers of notifications to enable events. GENA 308 formats are used in UPnP to create the presence announcements to be sent using SSDP 314 and to provide the ability to signal changes in service state for UPnP eventing. A control point interested in receiving event notifications will subscribe to an event source by sending a request that includes the service of interest, a location to send the events to and a subscription time for the event notification. The subscription must be renewed periodically to continue to receive notifications, and can also be canceled using GENA 308.

Simple Object Access Protocol (SOAP) 310 defines the use of Extensible Markup Language (XML) and HTTP 312 to execute remote procedure calls (RPC). It is becoming the standard for RPC based communication over the Internet. By making use of the Internet's existing infrastructure, it can work effectively with firewalls and proxies. SOAP 310 can also make use of Secure Sockets Layer (SSL) for security and use HTTP's connection management facilities, thereby making distributed communication over the Internet as easy as accessing web pages. Much like a remote procedure call, UPnP uses SOAP 310 to deliver control messages to devices and return results or errors back to control points. Each UPnP control request is a SOAP 310 message that contains the action to invoke along with a set of parameters. The response is a SOAP 310 message as well and contains the status, return value, and any return parameters.

UPnP provides support for communication between control points and devices. The network media, the TCP/IP protocol suite and HTTP provide basic network connectivity and addressing needed. On top of these open, standard, Internet based protocols, UPnP defines a set of HTTP servers to handle discovery, description, control, events, and presentation. The UPnP device architecture defines a schema or template for creating device and service descriptions for any device or service type. Individual working committees subsequently standardize on various device and service types and create a template for each individual device or service type. Finally, a vendor fills in this template with information specific to the device or service, such as the device name, model number, manufacturer name, and URL to the service description. This data is then encapsulated in the UPnP-specific protocols defined in the UPnP device architecture document (such as the XML device description template). The required UPnP specific information is inserted into all messages before they are formatted using SSDP, GENA, and SOAP and delivered via HTTP, HTTPU, or HTTPMU.

The foundation for UPnP networking is the TCP/IP protocol suite and the key to this suite is addressing. Each device typically will have a DHCP client and search for a DHCP server when the device is first connected to the network. If a DHCP server is available, the device will use the IP address assigned to it. If no DHCP server is available, the device will use Auto IP to obtain an address. In brief, Auto IP defines how a device intelligently chooses an IP address from a set of reserved private addresses, and is able to move easily between managed and unmanaged networks. A device may implement higher layer protocols outside of UPnP that use friendly names for devices. In these cases, it becomes necessary to resolve friendly host (device) names to IP addresses. Domain Name Services are usually used for this. A device that requires or uses this functionality may include a DNS client and may support dynamic DNS registration for its own name to address mapping.

Once devices are attached to the network and addressed appropriately, discovery can take place. Discovery is handled by SSDP as discussed earlier. When a device is added to the network, SSDP allows that device to advertise its services to control points on the network. When a control point is added to the network, SSDP allows that control point to search for devices of interest on the network. The fundamental exchange in both cases is a discovery message containing a few, essential specifics about the device or one of its services, for example its type, identifier, and a pointer to its XML device description document.

The next step in UPnP networking is description. After a control point has discovered a device, the control point still knows very little about the device. For the control point to learn more about the device and its capabilities, or to interact with the device, the control point will retrieve the device's description from the URL provided by the device in the discovery message. Devices may contain other logical devices and services. The UPnP description for a device is expressed in XML and may include vendor-specific manufacturer information including the model name and number, serial number, manufacturer name, and URLs to vendor-specific Web sites. The description also includes a list of any embedded devices or services, as well as URLs for control, eventing, and presentation.

After a control point has retrieved a description of the device, the control point has the essentials for device control. To learn more about the service, a control point will retrieve a detailed UPnP description for each service. The description for a service is also expressed in XML and includes a list of the commands or actions the service responds to, and parameters or arguments for each action. The description for a service also includes a list of variables; these variables model the state of the service at run time and are described in terms of their data type, range, and event characteristics. To control a device, a control point sends an action request to a device's service. To do this, a control point sends a suitable control message to the control URL for the service, provided in the device description. Control messages are also expressed in XML using SOAP. In response to the control message, the service returns action specific values or fault codes.

A UPnP description for a service includes a list of actions the service responds to and a list of variables that model the state of the service at run time. The service publishes updates when these variables change and a control point may subscribe to receive this information. The service publishes updates by sending event messages. Event messages contain the names of one of more state variables and the current value of those variables. These messages are also expressed in XML and formatted using GENA. A special initial event message is sent when a control point first subscribes; this event message contains the names and values for all evented variables and allows the subscriber to initialize its model of the state of the service. To support multiple control points, all subscribers are sent all event messages, subscribers receive event messages for all evented variables, and event messages are sent regardless of why the state variable changed (e.g., in response to an action request or due to a state change).

If a device has a URL for presentation, then the control point can retrieve a page from this URL, load the page into a browser and, depending on the capabilities of the page, allow a user to control the device and/or view device status. The degree to which each of these can be accomplished depends on the specific capabilities of the presentation page and device.

III. Peer-to-Peer Networking Infrastructure

The present invention leverages the use of a peer-to-peer network infrastructure for efficient scaling and increasing reach of UPnP device discovery and eventing. In the description that follows the invention is described as being implemented over a peer-to-peer network infrastructure such as the Windows® Peer-to-Peer Networking Infrastructure by Microsoft Corporation of Redmond, Wash. As will be appreciated by one of ordinary skill in the art, the network infrastructure should be understood to include any network infrastructure possessing the necessary communications and security protocols.

Figure 4:
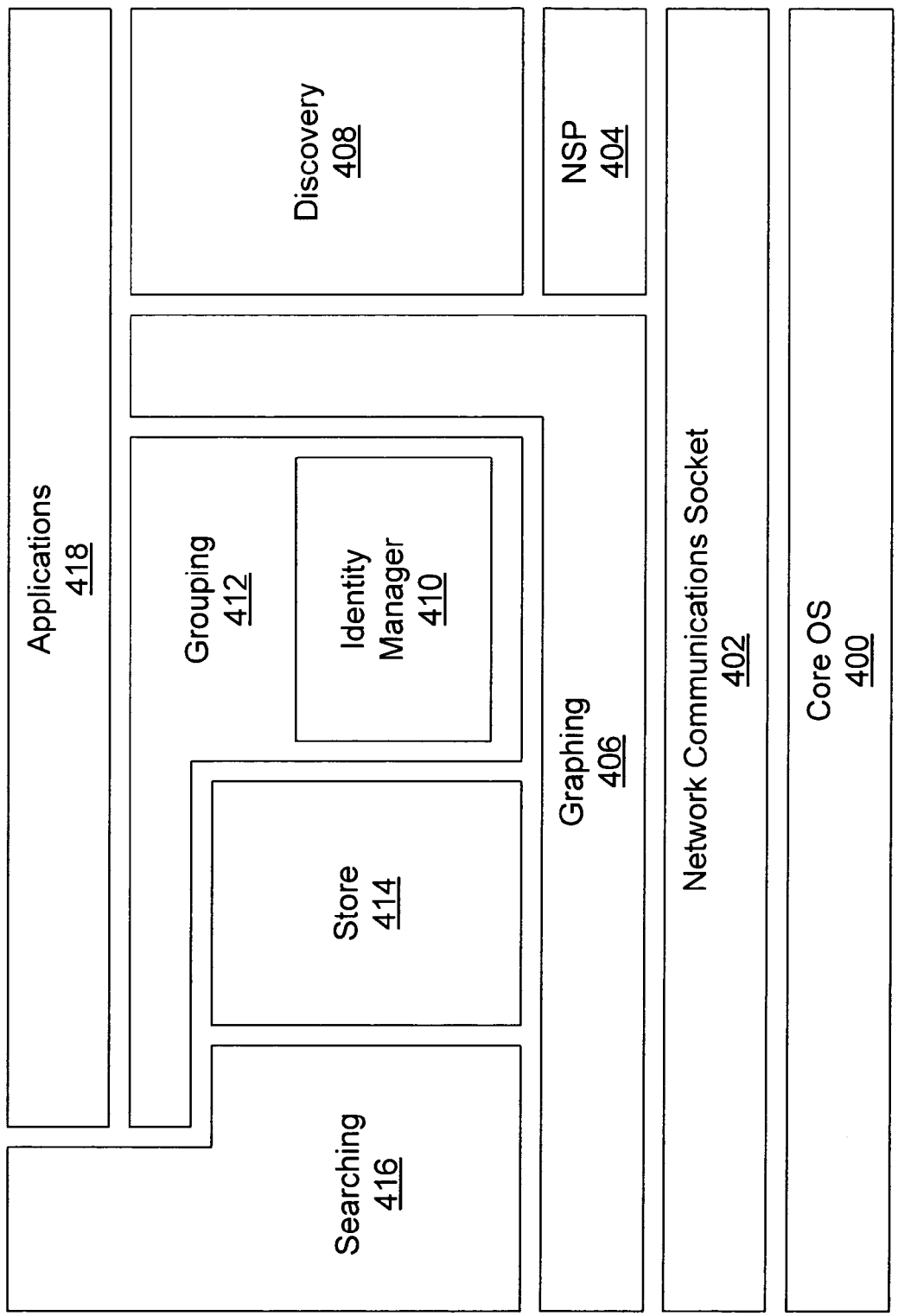
FIG. 4 is a schematic diagram showing an exemplary peer-to-peer networking infrastructure architecture.

Turning to FIG. 4, an exemplary peer-to-peer architecture is illustrated. The peer-to-peer infrastructure resides primarily between the operating system (OS) 400 and socket 402 layers and the application layer 418. Of particular importance are the network service provider (NSP) 404, discovery 408, graphing 406, and grouping 412 components. The search component 416 also may reside along and between the graphing component 406 and may reach to the application layer 418. At the bottom most layer of the architecture is the core OS 400. The OS is, in one embodiment, the Windows® operating system by Microsoft Corporation of Redmond, Wash. As will be appreciated by one of ordinary skill in the art, the OS should be understood to also include similar operating systems. Residing between the peer-to-peer architecture and the OS is the network communications socket layer 402. The socket layer 402 allows the peer-to-peer architecture to leverage the operating system's interface with lower level network communication protocols. The discovery protocol 408 is a peer name resolution protocol (PNRP) that enables the resolution of a peer name to an IP address in a completely serverless fashion. Thus, with the discovery protocol 408, it is possible for a computing device to locate a peer on a network without the need for a separate server to maintain peer network location information. The graphing component 406 allows for the organization of a given set of network nodes so that data can be efficiently disseminated amongst them. Specifically, graphing 406 addresses data dissemination in a network that is not fully connected and provides for one-to-many dissemination of the data. The grouping component 412 associates a security model with one or more graphs created by the graphing component 406. With the grouping 412 module, a peer is able to create a group, own a group, and define members (users or machines) that are allowed to join the group.

In one embodiment of the graphing component 406 employed by the present invention, interfaces and methods can be implemented through an application programming interface (API). Such an embodiment is particularly well suited for the Microsoft Windows XP® operating system in which the APIs may be as follows:

```
// Graph interfaces
HRESULT WINAPI PeerGraphStartup(
    IN WORD wVersionRequested,
    OUT PPEER_VERSION_DATA pVersionData);
HRESULT WINAPI PeerGraphShutdown( );
VOID WINAPI PeerGraphFreeData(
    IN PVOID                    pvData);
HRESULT WINAPI PeerGraphGetItemCount(
    IN HPEERENUM                hPeerEnum,
    OUT PULONG                  pCount);
HRESULT WINAPI PeerGraphGetNextItem(
    IN HPEERENUM                hPeerEnum,
    IN OUT PULONG               pCount,
    OUT PVOID        *          ppvItems);
HRESULT WINAPI PeerGraphEndEnumeration(
    IN HPEERENUM                hPeerEnum);
HRESULT WINAPI PeerGraphCreate(
    IN PPEER_GRAPH_PROPERTIES pGraphProperties,
    IN PCWSTR                   pwzDatabaseName,
    IN PPEER_SECURITY_INTERFACE
pSecurityInterface,
    OUT PHGRAPH                 phGraph);
HRESULT WINAPI PeerGraphOpen(
    IN PCWSTR                   pwzGraphId,
    IN PCWSTR                   pwzPeerId,
    IN PCWSTR                   pwzDatabaseName,
```

```
            IN PPEER_SECURITY_INTERFACE
pSecurityInterface,
        IN ULONG                cRecordTypeSyncPrecedence,
        IN GUID *               pRecordTypeSyncPrecedence,
        OUT PHGRAPH             phGraph);
HRESULT WINAPI PeerGraphListen(
        IN HGRAPH               hGraph,
        IN DWORD                dwScope,
        IN DWORD                dwScopeId,
        IN WORD                 wPort);
HRESULT WINAPI PeerGraphConnect(
        IN HGRAPH               hGraph,
        IN PCWSTR               pwzPeerId,
        IN PPEER_ADDRESS pAddress,
        OUT ULONGLONG * pullConnectionId);
HRESULT WINAPI PeerGraphClose(
        IN HGRAPH               hGraph);
HRESULT WINAPI PeerGraphDelete(
        IN PCWSTR               pwzGraphId,
        IN PCWSTR               pwzPeerId,
        IN PCWSTR               pwzDatabaseName);
HRESULT WINAPI PeerGraphGetStatus(
        IN HGRAPH               hGraph,
        OUT DWORD      *        pdwStatus);
HRESULT WINAPI PeerGraphGetProperties(
        IN HGRAPH               hGraph,
        OUT PPEER_GRAPH_PROPERTIES *
ppGraphProperties);
HRESULT WINAPI PeerGraphSetProperties(
        IN HGRAPH               hGraph,
        IN PPEER_GRAPH_PROPERTIES pGraphProperties);
// Eventing interfaces
HRESULT WINAPI PeerGraphRegisterEvent(
        IN HGRAPH               hGraph,
        IN HANDLE               hEvent,
        IN ULONG                cEventRegistrations,
        IN PPEER_GRAPH_EVENT_REGISTRATION
pEventRegistrations,
        OUT HPEEREVENT * phPeerEvent);
HRESULT WINAPI PeerGraphUnregisterEvent(
        IN HPEEREVENT           hPeerEvent);
HRESULT WINAPI PeerGraphGetEventData(
        IN HPEEREVENT           hPeerEvent,
        OUT PPEER_GRAPH_EVENT_DATA * ppEventData);
// Data Storage
HRESULT WINAPI PeerGraphGetRecord(
        IN HGRAPH               hGraph,
        IN GUID *               pRecordId,
        OUT PPEER_RECORD * ppRecord);
HRESULT WINAPI PeerGraphAddRecord(
        IN HGRAPH               hGraph,
        IN PPEER_RECORD         pRecord,
        OUT GUID       *        pRecordId);
HRESULT WINAPI PeerGraphUpdateRecord(
        IN HGRAPH               hGraph,
        IN PPEER_RECORD         pRecord);
HRESULT WINAPI PeerGraphDeleteRecord(
        IN HGRAPH               hGraph,
        IN GUID *               pRecordId,
        IN BOOL                 fLocal);
HRESULT WINAPI PeerGraphEnumRecords(
        IN HGRAPH               hGraph,
        IN GUID *               pRecordType,
        IN PCWSTR               pwzPeerId,
        OUT HPEERENUM *         phPeerEnum);
HRESULT WINAPI PeerGraphSearchRecords(
        IN HGRAPH               hGraph,
        IN PCWSTR               pwzCriteria,
        OUT HPEERENUM   *       phPeerEnum);
HRESULT WINAPI PeerGraphExportDatabase(
        IN HGRAPH               hGraph,
        IN PCWSTR               pwzFilePath);
HRESULT WINAPI PeerGraphImportDatabase(
        IN HGRAPH               hGraph,
        IN PCWSTR               pwzFilePath);
HRESULT WINAPI PeerGraphValidateDeferredRecords(
        IN HGRAPH               hGraph,
        IN ULONG                cRecordIds,
        IN GUID *               pRecordIds);
// Node/Connection interfaces
HRESULT WINAPI PeerGraphOpenDirectConnection(
        IN HGRAPH               hGraph,
        IN PCWSTR               pwzPeerId,
        IN PPEER_ADDRESS pAddress,
        OUT ULONGLONG *         pullConnectionId);
HRESULT WINAPI PeerGraphSendData(
        IN HGRAPH               hGraph,
        IN ULONGLONG            ullConnectionId,
        IN GUID *               pType,
        IN ULONG                cbData,
        IN PVOID                pvData);
HRESULT WINAPI PeerGraphCloseDirectConnection(
        IN HGRAPH               hGraph,
        IN ULONGLONG            ullConnectionId);
HRESULT WINAPI PeerGraphEnumConnections(
        IN HGRAPH               hGraph,
        IN DWORD                dwFlags,        //
PEER_CONNECTION_FLAGS
        OUT HPEERENUM   *       phPeerEnum);
HRESULT WINAPI PeerGraphEnumNodes(
        IN HGRAPH               hGraph,
        IN PCWSTR               pwzPeerId,
        OUT HPEERENUM   *       phPeerEnum);
HRESULT WINAPI PeerGraphSetPresence(
        IN HGRAPH               hGraph,
        IN BOOL                 fPresent);
HRESULT WINAPI PeerGraphGetNodeInfo(
        IN HGRAPH               hGraph,
        IN ULONGLONG            ullNodeId,
        OUT PPEER_NODE_INFO * ppNodeInfo);
HRESULT WINAPI PeerGraphSetNodeAttributes(
        IN HGRAPH               hGraph,
        IN PCWSTR               pwzAttributes);
HRESULT WINAPI PeerGraphSystemTimeFromGraphTime(
        IN HGRAPH               hGraph,
        IN FILETIME *           pftGraphTime,
        OUT FILETIME *          pftSystemTime);
```

In one embodiment of the grouping component 412 employed by the present invention, interfaces and methods can be implemented through an API. Such an embodiment is particularly well suited for the Microsoft Windows XP® operating system in which the APIs may be as follows:

```
HRESULT WINAPI PeerGroupStartup(
        IN WORD                 wVersionRequested,
        OUT PPEER_VERSION_DATA pVersionData);
HRESULT WINAPI PeerGroupShutdown( );
VOID WINAPI PeerFreeData(
        IN PVOID                pvData);
HRESULT WINAPI PeerGetItemCount(
        IN HPEERENUM            hPeerEnum,
        OUT PULONG              pCount);
HRESULT WINAPI PeerGetNextItem(
        IN HPEERENUM            hPeerEnum,
        IN OUT PULONG           pCount,
        OUT PVOID      *        ppvItems);
HRESULT WINAPI PeerEndEnumeration(
        IN HPEERENUM            hPeerEnum);
//////////////////////////////////////////
// Group interfaces
HRESULT WINAPI PeerGroupCreate(
        IN PPEER_GROUP_PROPERTIES pProperties,
        OUT HGROUP     *        phGroup);
HRESULT WINAPI PeerGroupOpen(
        IN PCWSTR               pwzIdentity,
        IN PCWSTR               pwzGroupPeerName,
        IN PCWSTR               pwzCloud,
        OUT HGROUP     *        phGroup);
HRESULT WINAPI PeerGroupJoin(
        IN PCWSTR               pwzIdentity,
        IN PCWSTR               pwzInvitation,
        IN PCWSTR               pwzCloud,
```

-continued
```
        OUT HGROUP          *         phGroup);
HRESULT WINAPI PeerGroupConnect(
        IN HGROUP                     hGroup);
HRESULT WINAPI PeerGroupClose(
        IN HGROUP                     hGroup);
HRESULT WINAPI PeerGroupDelete(
        IN PCWSTR                     pwzIdentity,
        IN PCWSTR                     pwzGroupPeerName);
HRESULT WINAPI PeerGroupCreateInvitation(
        IN HGROUP                     hGroup,
        IN PCWSTR                     pwzIdentityInfo,
        IN FILETIME *                 pftExpiration,
        IN ULONG                      cRoles,
        IN PEER_ROLE_ID*              pRoles,
        OUT PWSTR           *         ppwzInvitation);
HRESULT WINAPI PeerGroupParseInvitation(
        IN PCWSTR                     pwzInvitation,
        OUT PPEER_INVITATION_INFO * ppInvitationInfo);
HRESULT WINAPI PeerGroupGetStatus(
        IN HGROUP                     hGroup,
        OUT DWORD           *         pdwStatus);
HRESULT WINAPI PeerGroupGetProperties(
        IN HGROUP                     hGroup,
        OUT PPEER_GROUP_PROPERTIES * ppProperties);
HRESULT WINAPI PeerGroupSetProperties(
        IN HGROUP                     hGroup,
        IN PPEER_GROUP_PROPERTIES pProperties);
HRESULT WINAPI PeerGroupEnumMembers(
        IN HGROUP                     hGroup,
        IN DWORD                      dwFlags,       //
PEER_MEMBER_FLAGS
        IN PCWSTR                     pwzIdentity,
        OUT HPEERENUM       *         phPeerEnum);
HRESULT WINAPI PeerGroupOpenDirectConnection(
        IN HGROUP                     hGroup,
        IN PCWSTR                     pwzIdentity,
        IN PPEER_ADDRESS pAddress,
        OUT ULONGLONG       *         pullConnectionId);
HRESULT WINAPI PeerGroupCloseDirectConnection(
        IN HGROUP                     hGroup,
        IN ULONGLONG                  ullConnectionId);
HRESULT WINAPI PeerGroupEnumConnections(
        IN HGROUP                     hGroup,
        IN DWORD                      dwFlags,       //
PEER_CONNECTION_FLAGS
        OUT HPEERENUM       *         phPeerEnum);
HRESULT WINAPI PeerGroupSendData(
        IN HGROUP                     hGroup,
        IN ULONGLONG                  ullConnectionId,
        IN GUID *                     pType,
        IN ULONG                      cbData,
        IN PVOID                      pvData);
// Eventing interfaces
HRESULT WINAPI PeerGroupRegisterEvent(
        IN HGROUP                     hGroup,
        IN HANDLE                     hEvent,
        IN DWORD                      cEventRegistration,
        IN PPEER_GROUP_EVENT_REGISTRATION
pEventRegistrations,
        OUT HPEEREVENT *              phPeerEvent);
HRESULT WINAPI PeerGroupUnregisterEvent(
        IN HPEEREVENT                 hPeerEvent);
HRESULT WINAPI PeerGroupGetEventData(
        IN HPEEREVENT                 hPeerEvent,
        OUT PPEER_GROUP_EVENT_DATA * ppEventData);
// Data Storage
HRESULT WINAPI PeerGroupGetRecord(
        IN HGROUP                     hGroup,
        IN GUID *                     pRecordId,
        OUT PPEER_RECORD * ppRecord);
HRESULT WINAPI PeerGroupAddRecord(
        IN HGROUP                     hGroup,
        IN PPEER_RECORD pRecord,
        OUT GUID            *         pRecordId);
HRESULT WINAPI PeerGroupUpdateRecord(
        IN HGROUP                     hGroup,
        IN PPEER_RECORD pRecord);
HRESULT WINAPI PeerGroupDeleteRecord(
        IN HGROUP                     hGroup,
```

-continued
```
        IN GUID *                     pRecordId);
HRESULT WINAPI PeerGroupEnumRecords(
        IN HGROUP                     hGroup,
        IN GUID *                     pRecordType,
        OUT HPEERENUM       *         phPeerEnum);
HRESULT WINAPI PeerGroupSearchRecords(
        IN HGROUP                     hGroup,
        IN PCWSTR                     pwzCriteria,
        OUT HPEERENUM       *         phPeerEnum);
HRESULT WINAPI PeerGroupExportDatabase(
        IN HGROUP                     hGroup,
        IN PCWSTR                     pwzFilePath);
HRESULT WINAPI PeerGroupImportDatabase(
        IN HGROUP                     hGroup,
        IN PCWSTR                     pwzFilePath);
HRESULT WINAPI PeerGroupAuthorizeMembership(
        IN HGROUP                     hGroup,
        IN PPEER_MEMBERSHIP_INFO pMemberInfo,
        IN BOOL                       fAuthorize);
HRESULT WINAPI PeerGroupPeerTimeToUniversalTime(
        IN HGROUP                     hGroup,
        IN FILETIME *                 pftPeerTime,
        OUT FILETIME *                pftUniversalTime);
HRESULT WINAPI PeerGroupUniversalTimeToPeerTime(
        IN HGROUP                     hGroup,
        IN FILETIME *                 pftUniversalTime,
        OUT FILETIME *                pftPeerTime);
```

Figure 5:
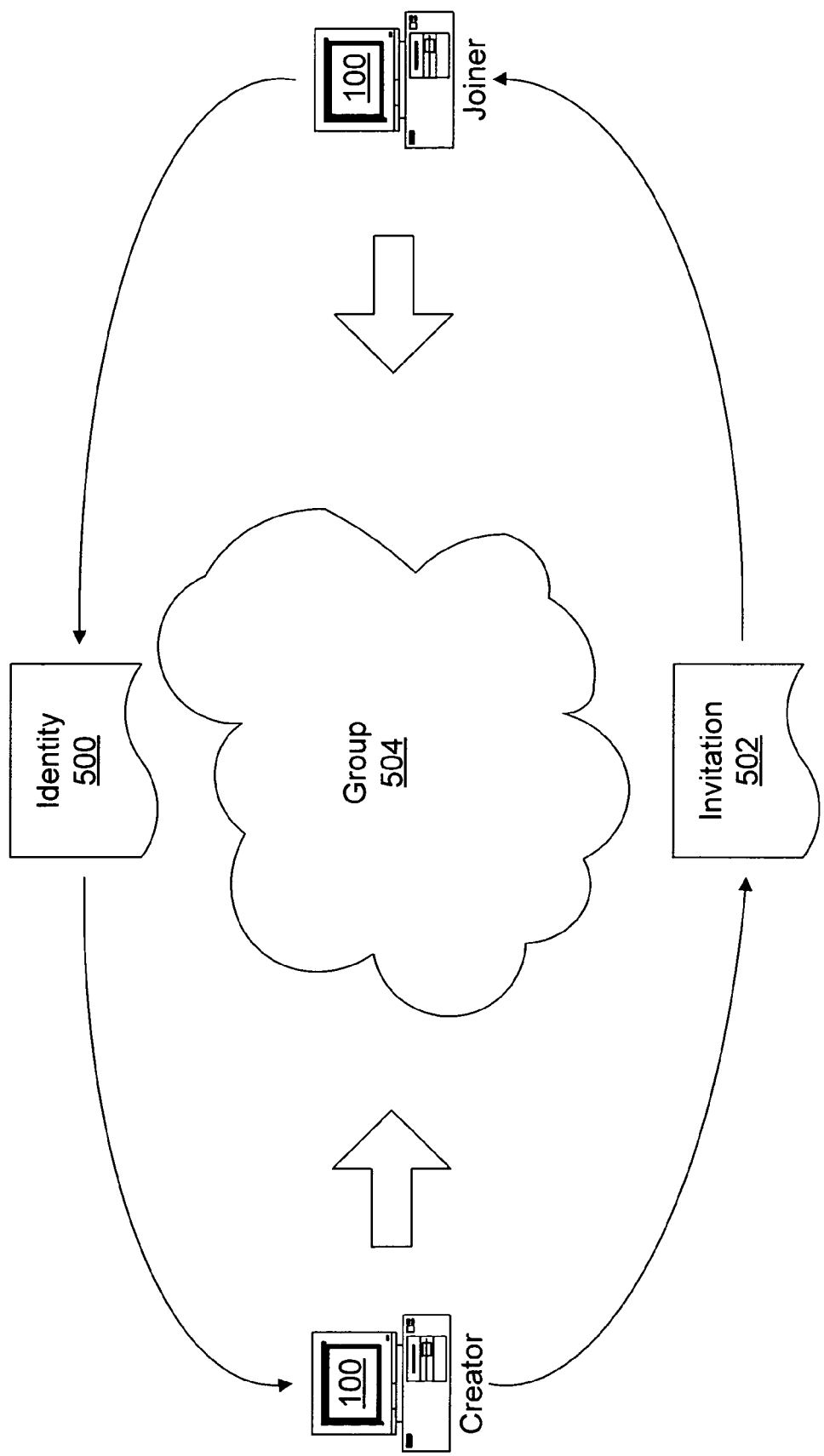
FIG. 5 is a schematic diagram illustrating the process of a peer node joining a peer-to-peer group.
Figure 6:
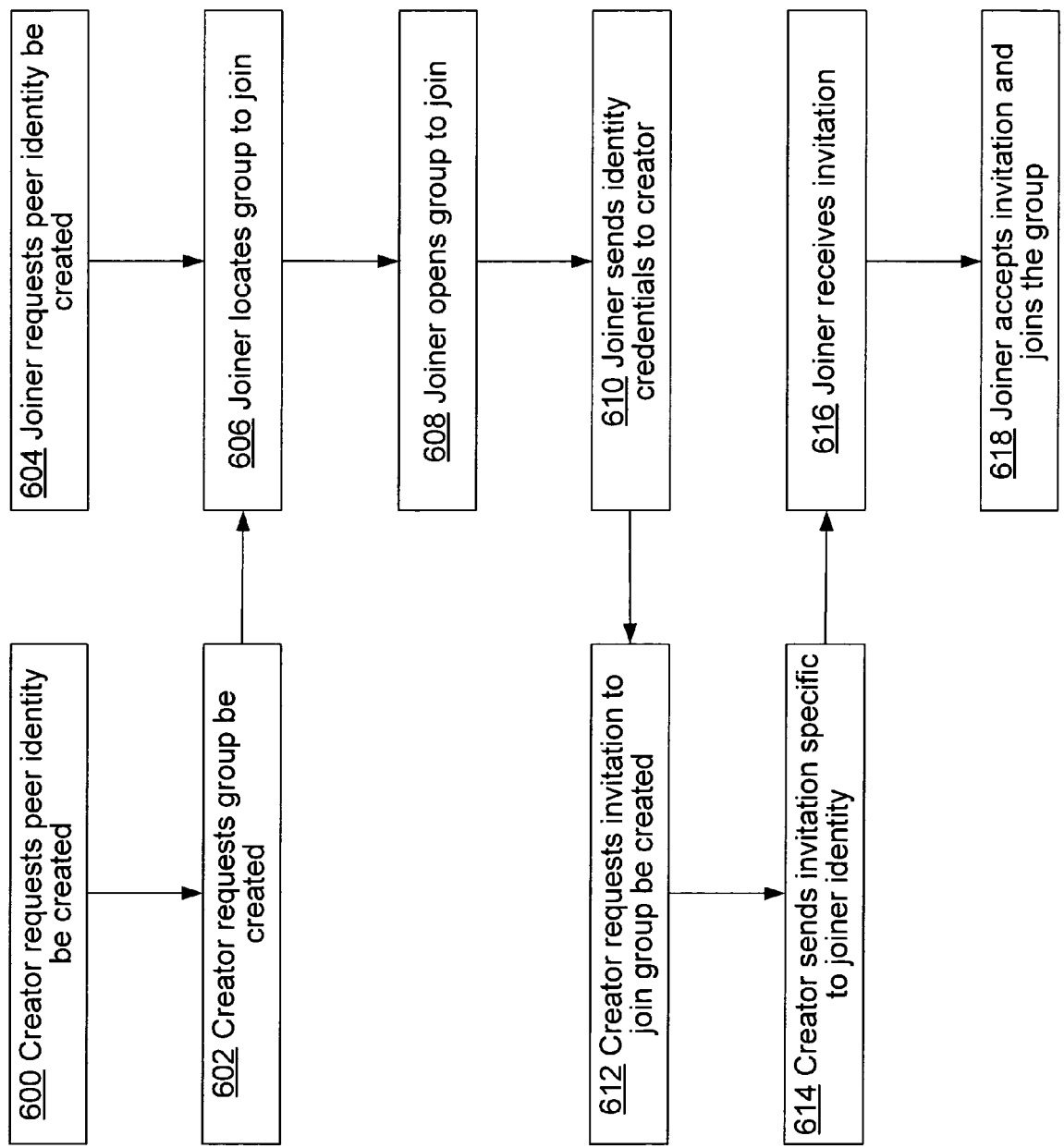
FIG. 6 is a flowchart illustrating the process of a peer node joining a peer-to-peer group.

FIGS. 5 and 6 illustrate the peer-to-peer group creation and joining process. Beginning with step 600, the group creator 100 requests that a peer identity for the application be created by the identity manager 410. Next, in step 602, the group creator 100 requests that a group 504 be created. In step 604 a group joiner 100 requests that a peer identity be created by the identity manager 410. Next, in step 606, using the discovery protocol 408 the group joiner 100 locates a group 504 to join. In step 608 the group joiner 100 opens the group 504 that the joiner wishes to join and in step 610 the group joiner 100 sends its identity 500 credentials to the group creator 100. Upon receipt of the group joiner's identity credentials 500 by the group creator 100, in step 612, the group creator 100 requests that an invitation 502 be created to send to the group joiner 100. Next, in step 614, the group creator 100 sends the invitation 502 to the group joiner 100. Upon receipt of the invitation 502 in step 616, the group joiner 100 accepts the invitation 502 and joins the group 504 in step 618. The preceding steps can be repeated resulting in the formation of a peer-to-peer group such as the one illustrated in FIG. 7.

IV. Scaling UPnP Device Discovery and Eventing Utilizing a Peer-to-Peer Network Infrastructure UPnP device discovery and eventing is currently quite inefficient when a large number of control points exist. With respect to device discovery, it is highly desirable that devices are able to be discovered in a rapid fashion and that the discovery is scaled to reach beyond the subnet as well. Specifically, the goal with discovery is to ensure that all control points receive the announcement that a device has joined the network. The goal with eventing is to ensure that all control points get the notification of an update on the device. For instance, if the various control points are displaying a user interface showing the current picture on a picture frame, then if one of the control points shifts to the next picture, then the rest of the control points are sent a notification by the device about the change in its status.

As it stands now, the above processes are extremely inefficient. In each case the device sequentially establishes a connection with each control point and sends it an announcement or notification. In the presence of a large number of control points, this mechanism does not scale efficiently, and many control points end up getting announcements and notifications much later than the initial ones. UPnP device discovery and eventing can be effectively scaled by leveraging the use of a peer-to-peer network infrastructure.

Peer-to-peer networking provides an infrastructure that enables computing devices to communicate and share information securely with one another without the need of a server or other third party to facilitate the communication. Peer-to-peer networking allows for organization of a set of nodes for efficient exchange of information. Such an organization is called a group and in the context of a group, members can share data with each other. The group has an efficient mechanism for flooding data to all members in it, and this mechanism is scalable as well.

In the peer-to-peer infrastructure, peer groups can also facilitate the efficient distribution of metadata over networks. This metadata could be UPnP announcement and notification data. Thus, a peer-to-peer networking infrastructure can be effectively employed to improve the efficiency of device announcement and notification distribution and the corresponding scalability. In a network of peers, a handful of the peers can receive device announcements and notifications from the UPnP device. These peers can then flood this content out to a few more peers who in turn can send the device announcements and notifications along to others. Ultimately, this method produces a result whereby device discovery and eventing tasks can be fulfilled by locating the closest peer and obtaining the device announcements and notifications from that peer.

Figure 7:
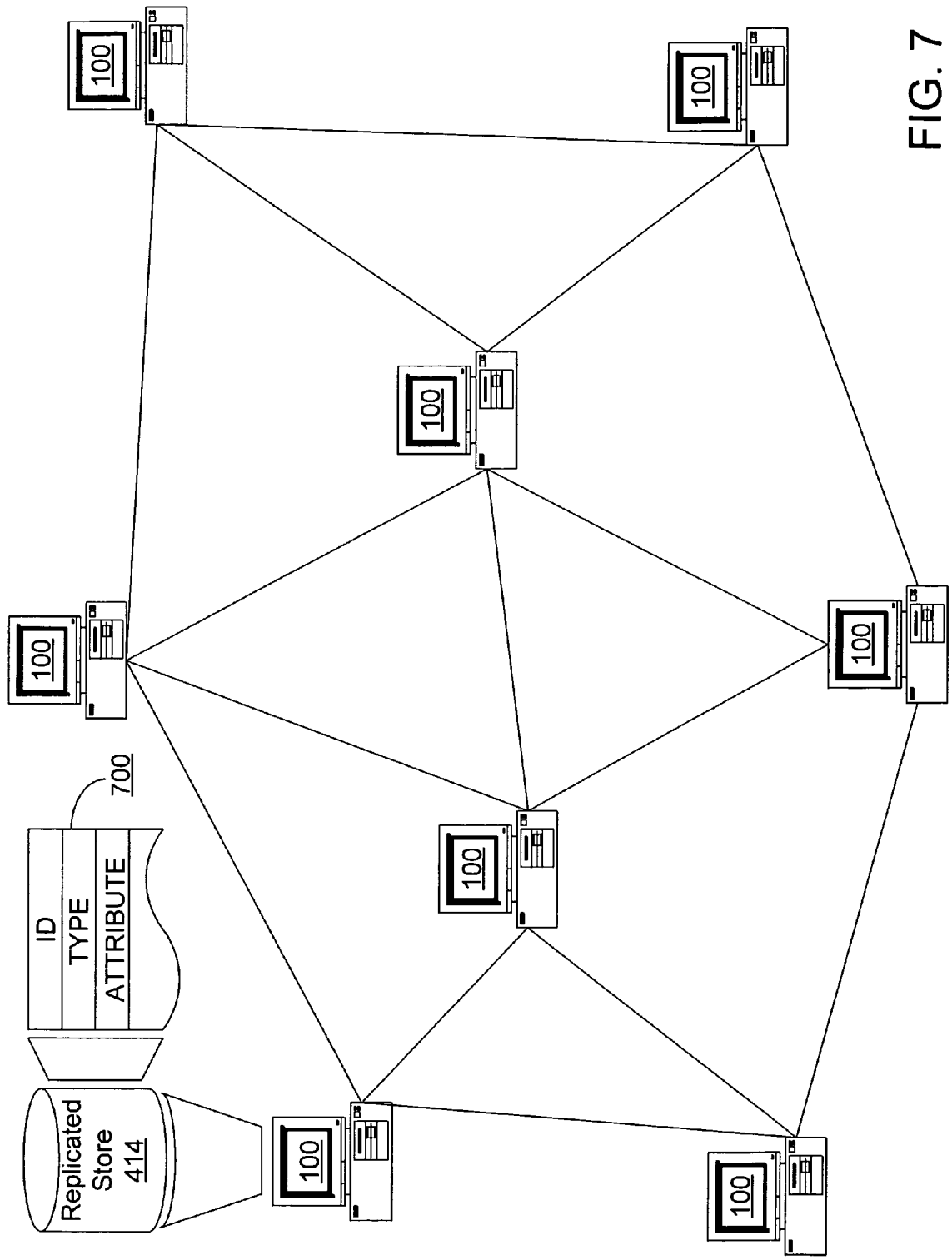
FIG. 7 is a schematic diagram showing an exemplary peer-to-peer group.

With reference to FIG. 7, an exemplary peer-to-peer group is illustrated. In the group, each peer-to-peer node 100 is reachable via a path on the graph of the group. Each peer node 100 in the group has an instance of the replicated store 414. The replicated store 414 is associated with a graph or a group and maintains metadata as to the current state of each node. When a node 100 connects to a group it first synchronizes the replicated store database 414. The nodes 100 maintain this database automatically.

The replicated store 414 houses metadata about the peer-to-peer group in the form of records 700 residing in the store 414. Each record can contain a record ID field, a record type field, and an attribute field. In the case of the present invention, the metadata in the store reflects what UPnP devices have been discovered on the network and/or what UPnP device event notifications have been distributed to nodes 100 of the group. For each piece of metadata that has been distributed to a node 100 in the group, a record 700 corresponding to that piece of metadata exists in the replicated store 414.

Figure 8:
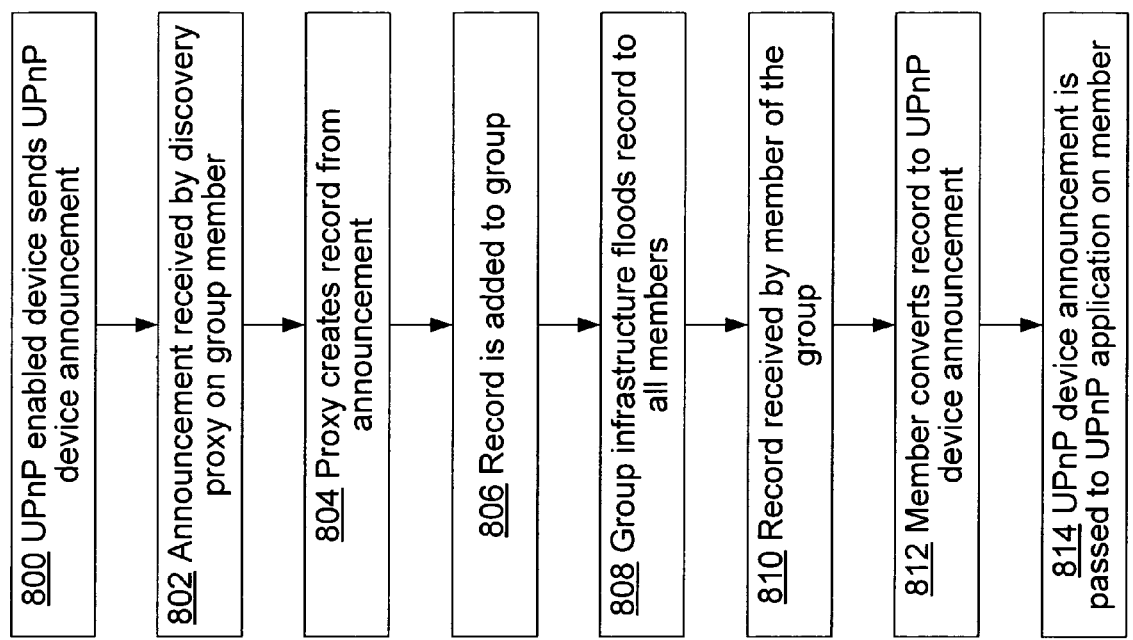
FIG. 8 is a flowchart illustrating the method of scaling UPnP device discovery using a peer-to-peer networking infrastructure.
Figure 9:
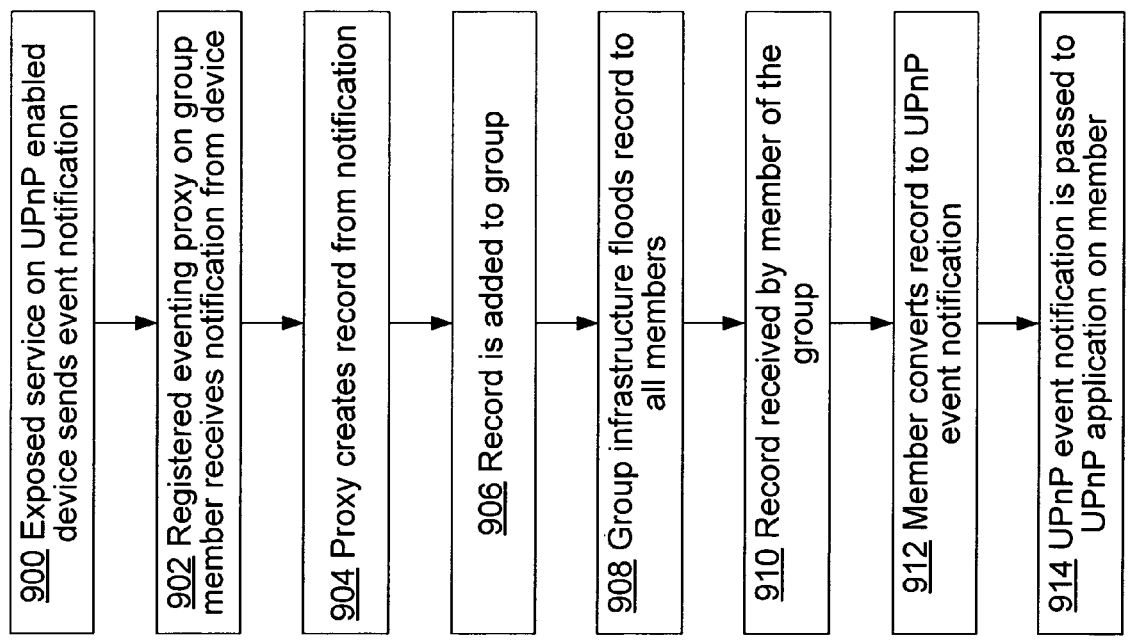
FIG. 9 is a flowchart illustrating the method of scaling UPnP device eventing using a peer-to-peer networking infrastructure.

Turning to FIGS. 8 and 9, the methods of scaling UPnP device discovery and eventing using a peer-to-peer networking infrastructure are illustrated respectively. Beginning with step 800, after successfully obtaining an IP address on the network, a UPnP enabled device sends an announcement advertising its availability. Continuing with step 802, the announcement is received by a UPnP device discovery proxy residing on a peer group member computing device. In step 804, the proxy creates a record to be distributed to the group from the device announcement and, in step 806, the record is added to the group store. Next, in step 808, the record is propagated through the peer-to-peer group via updates to the instances of the replicated stores located on the member computing devices to reflect the device announcement record that was added in step 806. In step 810, the update to the instances of the replicated store is received at the nodes of the group. Next, in step 812, a node can consult the replicated store to obtain the record and, recognizing it as a UPnP announcement, can convert the record to a UPnP announcement. Finally, in step 814, the UPnP announcement is passed to the UPnP application layer on the member node.

A similar process appears in FIG. 9 as the method of scaling UPnP device eventing is illustrated. Beginning with step 900, with a service being exposed on a UPnP device, the UPnP enabled device sends an event notification containing the changed value of the service's variable. Continuing with step 902, the event notification is received by a UPnP device eventing proxy residing on a peer group member computing device that has registered with the service to receive notifications. In step 904, the proxy creates a record to be distributed to the group from the event notification and, in step 906, the record is added to the group store. Next, in step 908, the record is propagated through the peer-to-peer group via updates to the instances of the replicated stores located on the member computing devices to reflect the event notification record that was added in step 906. In step 910, the update to the instances of the replicated store is received at the nodes of the group. Next, in step 912, a node can consult the replicated store to obtain the record and, recognizing it as a UPnP event notification, can convert the record to a UPnP event notification. Finally, in step 914, the UPnP event notification is passed to the UPnP application layer on the member node.

The above described methods can be employed to provide a highly scalable solution to UPnP device discovery and eventing. By leveraging the peer-to-peer network infrastructure, UPnP device discovery and event notification information can be efficiently disseminated over any number of UPnP network topologies thus minimizing the presence of a large number of control points.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for leveraging peer-to-peer network infrastructure to disseminate a Universal Plug and Play (UPnP) device announcement from a UPnP enabled device to other UPnP enabled devices in a UPnP network, the method comprising:

receiving, at a UPnP device discovery proxy, the UPnP device announcement, wherein the UPnP device discovery proxy is located on a first peer group member of a peer-to-peer group in a peer-to-peer networking infrastructure and each member of the peer-to-peer group includes UPnP functionality;

updating a peer group data store at the first peer group member with a record corresponding to the UPnP device announcement;

propagating, using a flooding mechanism of the peer-to-peer networking infrastructure without a facilitation of a UPnP control point, the record corresponding to the UPnP device announcement to a replicated local instance of the peer group data store residing on each of all other peer group members of the peer-to-peer group; and at the each of the all other peer group members:
receiving the record corresponding to the UPnP device announcement at, and passing the UPnP device announcement to the UPnP functionality on the each of the all other peer group members.

2. The method of claim 1, wherein updating the peer group data store with the record corresponding to the UPnP device announcement comprises:
  converting the UPnP device announcement to a record format compatible with the peer group data store, the record format including metadata corresponding to the UPnP enabled device; and
  entering, into the peer group data store, the converted UPnP device announcement as the record corresponding to the UPnP device announcement.

3. The method of claim 1, wherein propagating, using the flooding mechanism of the peer-to-peer networking infrastructure comprises propagating, using the flooding mechanism of the peer-to-peer networking infrastructure in a scalable fashion.

4. The method of claim 1, wherein:
  receiving the UPnP device announcement at the each of the all other peer group members comprises storing the UPnP device announcement in a record of a corresponding replicated local instance of the peer group data store residing on the each of the all other peer group members; and
  passing the UPnP device announcement to the UPnP functionality on the each of the all other peer group members comprises:
    obtaining the record from the corresponding replicated local instance of the peer group data store;
    recognizing the record as corresponding to the UPnP device announcement and converting the record to a format understood by the UPnP functionality; and
    passing the converted record corresponding to the UPnP device announcement to a UPnP application layer of the UPnP functionality on the each of the all other peer group members.

5. The method of claim 1, wherein the UPnP network is a local area network.

6. The method of claim 1, wherein the UPnP network is a wide area network.

7. The method of claim 1, further comprising, at an additional, new peer group member of the peer-to-peer group:
  locating a closest peer group member; and
  obtaining the UPnP device announcement from the closest peer group member.

8. The method of claim 1, wherein receiving the record corresponding to the UPnP device announcement at the each of the all other peer group members comprises receiving the record corresponding to the UPnP device announcement at least one other peer group member external to a UPnP subnet of which the first peer group member is a part.

9. At least one tangible computer storage medium having computer-executable instructions for performing a method for leveraging peer-to-peer network infrastructure to disseminate a Universal Plug and Play (UPnP) device announcement from a UPnP enabled device to other UPnP enabled devices in a UPnP network, the method comprising:
  receiving, at a UPnP device discovery proxy, the UPnP device announcement, wherein the UPnP device discovery proxy is located on a first peer group member of a peer-to-peer group in a peer-to-peer networking infrastructure and each member of the peer-to-peer group includes UPnP functionality;
  updating a peer group data store at the first peer group member with a record corresponding to the UPnP device announcement;
  propagating, using a flooding mechanism of the peer-to-peer networking infrastructure without a facilitation of a UPnP control point, the record corresponding to the UPnP device announcement to a replicated local instance of the peer group data store residing on each of the all other peer group members of the peer-to-peer group; and
  at the each of the all other peer group members:
    receiving the record corresponding to the UPnP device announcement, and
    passing the UPnP device announcement to the UPnP functionality.

10. The at least one tangible computer storage medium of claim 9, wherein the updating the peer group data store with the record corresponding to the UPnP device announcement comprises computer-executable instructions for:
  converting the UPnP device announcement to a record format compatible with the peer group data store, the record format including metadata corresponding to the UPnP enabled device; and
  entering, into the peer group data store, the converted UPnP device announcement as the record corresponding to the UPnP device announcement.

11. The at least one tangible computer storage medium of claim 9, wherein propagating, using the flooding mechanism of the peer-to-peer networking infrastructure comprises computer-executable instructions for propagating, using the flooding mechanism of the peer-to-peer networking infrastructure in a scalable fashion.

12. The at least one tangible computer storage medium of claim 9, wherein:
  receiving the UPnP device announcement at the each of the all other peer group members comprises computer-executable instructions for storing the UPnP device announcement in a record of a corresponding replicated local instance of the peer group data store residing on the each of the all other peer group members; and
  passing the UPnP device announcement to the UPnP functionality on the each of the all other peer group members comprises, at the each of the all other peer group members, computer-executable instructions for:
    obtaining the record from the corresponding replicated local instance of the peer group data store;
    recognizing the record as corresponding to the UPnP device announcement and converting the record to a format understood by the UPnP functionality; and
    passing the converted record corresponding to the UPnP device announcement to a UPnP application layer of the UPnP functionality.

13. The at least one tangible computer storage medium of claim 9, wherein the UPnP network is at least one of a local area network or a wide area network.

14. The at least one tangible computer storage medium of claim 9, further comprising computer-executable instructions for, at an additional, new peer group member of the peer-to-peer group:
  locating a closest peer group member; and
  obtaining the UPnP device announcement from the closest peer group member.

15. The at least one tangible computer storage medium of claim 9, wherein receiving the record corresponding to the UPnP device announcement at the each of the all other peer group members comprises computer-executable instructions for receiving the record corresponding to the UPnP device announcement at least one other peer group member external to a UPnP subnet of which the first peer group member is a part.

16. A system configured to disseminate a Universal Plug and Play (UPnP) device announcement from a UPnP enabled device to other UPnP enabled devices in a UPnP network, comprising:

a peer-to-peer group in a peer-to-peer network infrastructure, wherein each peer group member of the peer-to-peer group includes UPnP functionality;

a first peer group member of the peer-to-peer group, the first peer group member being a UPnP device discovery proxy and including a network communications module, wherein the network communications module comprises computer executable instructions for:

receiving the UPnP device announcement;

updating a peer group data store on the first peer group member with a record corresponding to the UPnP device announcement by converting the UPnP device announcement to a record format compatible with the peer group data store; and propagating the record corresponding to the UPnP device announcement to a replicated local instance of the peer group data store residing each of all other peer group members of the peer-to-peer group by flooding the record to the all other peer group members of the peer-to-peer group in a scalable fashion via a flooding mechanism of the peer-to-peer network infrastructure and without a facilitation of a UPnP control point; and at least one other peer group member of the peer-to-peer group, the at least one other peer group member including computer-executable instructions for receiving the flooded record corresponding to the UPnP device announcement, storing the flooded record in a corresponding replicated local instance of the peer group data store, and passing the UPnP device announcement to the UPnP functionality on the at least one other peer group member.

17. The system of claim 16, wherein the the at least one other peer group member further comprises computer-executable instructions for:

obtaining the flooded record corresponding to the received UPnP device announcement from the corresponding replicated local instance of the peer group data store;

recognizing the flooded record as corresponding to the received UPnP device announcement and converting the flooded record to a format understood by the UPnP functionality; and passing the converted flooded record corresponding to the UPnP device announcement to a UPnP application layer of the UPnP functionality.

18. The system of claim 16, wherein the UPnP network is one of a local area network or a wide area network.

19. The system of claim 16, further comprising an additional, new peer group member of the peer-to-peer group, the additional, new peer group member including computer-executable instructions for obtaining the UPnP device announcement from a closest peer group member in the peer-to-peer group.

20. The system of claim 16, wherein at least one of the at least one other peer group member of the peer-to-peer group is external to a UPnP subnet of which the first peer group member is a part.

\* \* \* \* \*

UNITED STATES PATENT AND TRADEMARK OFFICE
CERTIFICATE OF CORRECTION

PATENT NO. : 7,640,329 B2 Page 1 of 1
APPLICATION NO. : 11/059589
DATED : December 29, 2009
INVENTOR(S) : Rao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this

Ninth Day of November, 2010

David J. Kappos
*Director of the United States Patent and Trademark Office*